United States Patent [19]

Ichikawa

[11] Patent Number: 5,873,637
[45] Date of Patent: Feb. 23, 1999

[54] CAR WHEEL COVER AND WHEEL COVER INSTALLING CLIP

[75] Inventor: Takashi Ichikawa, Aichi-ken, Japan

[73] Assignee: Kabushiki Kaisha Tokai Rika Denki Seisakusho, Aichi-ken, Japan

[21] Appl. No.: 821,575

[22] Filed: Mar. 19, 1997

[30] Foreign Application Priority Data

Mar. 18, 1996 [JP] Japan ................................. 8-060839

[51] Int. Cl.⁶ ....................................................... B60B 7/06
[52] U.S. Cl. ...................................... 301/37.34; 301/37.31
[58] Field of Search ................................ 301/37.1, 37.24, 301/37.31, 37.34, 37.36, 37.42, 108.1

[56] References Cited

U.S. PATENT DOCUMENTS

| | | | |
|---|---|---|---|
| 2,386,243 | 10/1945 | Lyon | 301/37.36 |
| 2,927,824 | 3/1960 | Simon | 301/37.34 |
| 3,868,147 | 2/1975 | Beisch | 301/37.31 |
| 4,344,654 | 8/1982 | Apezynski | 301/37.42 X |

*Primary Examiner*—Russell D. Stormer
*Attorney, Agent, or Firm*—Birch, Stewart, Kolasch & Birch, LLP

[57] ABSTRACT

A clip having a sandwiching portion; a receiving surface; an elastic portion continuous with the sandwiching portion as well as a receiving surface positioned intermediate therebetween. The clip includes an angle-adjusting portion for adjusting the angle of the receiving surface so that the receiving surface is parallel with the underside of a wheel cover body. The angle-adjusting portion continuous with an end of the receiving surface is elastically pressed against the inner surface of a rim flange edge.

10 Claims, 5 Drawing Sheets

CAR WHEEL COVER AND WHEEL COVER INSTALLING CLIP

BACKGROUND OF THE INVENTION

1. Field of the Invention

The present invention generally relates to a wheel cover f or use in a car and particularly relates to a wheel cover installing clip comprising a sandwiching portion which is installed on a rim flange edge of a disc wheel of the car and a connection surface for fixing the wheel cover body thereto.

2. Description of the Related Art

The wheel cover is hitherto mounted on the disc wheel by utilizing a hump formed on a rim of the disc wheel. FIG. 4A is a sectional view showing a conventional disc wheel. FIG. 4B is an enlarged sectional view showing a part (B) of the disc wheel shown in FIG. 4A. As shown in FIG. 4B, a hump 3 is formed at a predetermined position of a rim 2 of a disc wheel 1 such that the hump 3 projects therefrom outward in the radial direction of the disc wheel 1. The hump 3 is formed to prevent the edge of a tire from moving inward. The hump 3 projects only about 0.5 mm from the rim 2, although it is exaggeratively illustrated.

A wheel cover 4 to be mounted on the disc wheel 1 by using the hump 3 has a configuration as shown in FIG. 5. That is, a disc-shaped wheel cover body 4a is formed integrally with a plurality of claws 4b projecting from the underside thereof by injection molding. The front end 4c of the claw 4b is fitted into a concave formed on the underside of the hump 3 and pressed thereinto. Then, the front end 4c of the claw 4b is pressed outward in the radial direction of the disc wheel 1 by means of a wire ring 70. In this manner, the wheel cover 4 is mounted on the disc wheel 1.

Many types of disc wheels 1 are manufactured. There is a variety in the type of disc wheels 1 having the same diameter. In most cases, the positions, depths, and sizes of the hump 3 are different from each other, respectively depending on the types of the disc wheels 1. Thus, the wheel cover 4 which is fixed to the disc wheel 1 utilizing the hump 3 is used exclusively for one type of the disc wheel 1.

In order to overcome this problem, the present applicant proposed a wheel cover which can be installed on disc wheels irrespective of types thereof if they have the standardized same diameter. That is, a clip is mounted on the rim flange edge 2a of the disc wheel 1 to install the wheel cover body on the disc wheel 1, as disclosed in Japanese Patent Applications Nos. 7-211628 and 7-217044.

FIGS. 6 and 7 show the construction having a clip 6a or 6b for installing a wheel cover body 7a or 7b on a disc wheel 1. Each of the clip 6a shown in FIG. 6 and the clip 6b shown in FIG. 7 has a sandwiching portion (A) for sandwiching the rim flange edge 2a of the rim 2 of the disc wheel 1 and the connection or receiving surface (B) for fixing the wheel cover 7a or the wheel cover 7b thereto. In FIG. 6, a plane fastener 8a for fixing the wheel cover 7a to a connection surface (B) is provided between the underside of the wheel cover 7a and the connection surface (B) of the clip 6a. The wheel cover body 7a is pressed against the connection surface (B) of the clip 6a at a right angle therewith to install the wheel cover body 7a on the connection surface (B). The construction shown in FIG. 7 has a snap engaging means 8b provided between the underside of the wheel cover body 7b and the connection surface (B) of the clip 6b. The snap engaging means 8b consists of a female button and a male button which engage each other. The wheel cover body 7b is pressed against the connection surface (B) of the clip 6b at a right angle therewith to install the wheel cover body 7b on the connection surface (B).

It often occurs that the rim flange edge 2a of the disc wheel 1 does have a size not conforming to the standardized size and the terminated portion of the rim flange edge 2a is dislocated from the predetermined position. Therefore, the clips 6a and 6b are likely to incline when they are installed on the rim flange edge 2a not conforming to the standardized size, which necessitates the control of the size of the clip: If the rim flange edge 2a is shorter than the standardized size as shown by an imaginary line of FIG. 8, one end of each of the clips 6a and 6b inclines outward (upward in FIG. 8) in the radial direction of the disc wheel 1, whereas if the rim flange edge 2a is longer than the standardized size as shown by an imaginary line of FIG. 9, one end of each of the clips 6a and 6b inclines inward (downward in FIG. 9) in the radial direction of the disc wheel 1. In both cases, it is necessary to adjust the connection surface (B) to be horizontal, namely, parallel with the underside of the wheel cover bodies 7a and 7b. In the former case as shown in FIG. 8, it is possible to install the wheel cover bodies 7a and 7b on the clips 6a and 6b, respectively by strongly pressing the wheel cover bodies 7a and 7b against the connection surface (B) and by pressing one end of the clips 6a and 6b downward, with the connection surface (B) placed in position relatively to the wheel cover bodies 7a and 7b, respectively. In the latter case as shown in FIG. 9, there is a gap between the connection surface (B) of each of the clips 6a and 6b and the underside of each of the wheel cover bodies 7a and 7b, which necessitates the use of the clips 6a and 6b whose connection surface is horizontal, namely, parallel with the underside of the wheel cover bodies 7a and 7b.

SUMMARY OF THE INVENTION

It is accordingly an object of the present invention to provide an improved wheel cover-installing clip in which the angle of a wheel cover-receiving surface can be adjusted in conformity to the inclination of a wheel cover, even though the position of a rim flange edge on which the clip has been installed is dislocated from a predetermined position, so as to eliminate the need for the control of a clip size.

The wheel cover-installing clip of the present invention comprises a connection portion having a receiving surface for fixing a wheel cover body thereto; and a sandwiching portion which is continuous with one end of the connection portion to sandwich a rim flange edge of a disc wheel of a car between two sandwiching walls thereof. In order to achieve the technical problem described previously, the clip and the wheel cover have the following construction, respectively.

The clip comprises an elastic portion continuous with the sandwiching portion as well as the connection surface positioned intermediate therebetween. The clip further comprises an angle-adjusting portion for adjusting the angle of the receiving surface to that of the wheel cover body, namely, adjusting the angle of the receiving surface so that it is parallel with the underside of the wheel cover body. The angle-adjusting portion is continuous with the other end of the connection portion to elastically press against the inner surface of the rim flange edge.

When the rim flange edge 2a is longer than the standardized size, the inner side of the clip in the radial direction of the disc wheel inclines downward. But the position of contact between the angle-adjusting portion and the rim flange edge is adjusted by pulling the angle-adjusting portion upward and inward in the radial direction of the disc wheel to flex the portion of the clip positioned intermediate between the sandwiching portion and the connection portion. In this manner, the angle of the angle-adjusting portion can be adjusted. That is, the receiving surface can be allowed to be parallel with underside of the wheel cover without an accurate size control of the clip.

The wheel cover according to the present invention comprises a disc-shaped wheel cover body; and a plurality of fixtures for fixing the wheel cover body to the receiving surface of the clip having the above-described construction. In this construction, the angle of the receiving surface of the clip can, be adjusted easily so that the receiving surface is parallel with the underside of the wheel cover body. Thus, the present invention provides a wheel cover which can be easily installed on the disc wheel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DESCRIPTION OF THE PREFERRED EMBODIMENTS

A car wheel cover and an installing clip according to an embodiment of the present invention will be described below in detail with reference to FIGS. 1 through 3.

Figure 1:
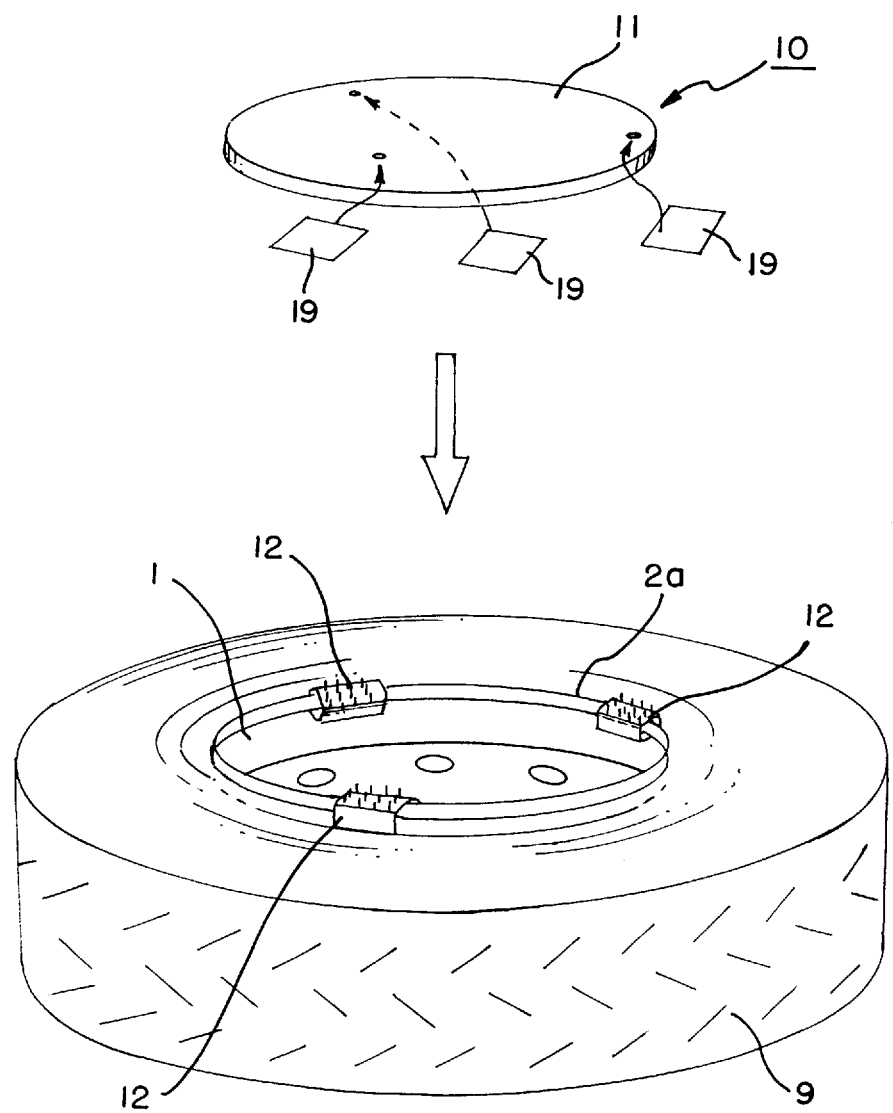
FIG. 1 is an exploded perspective view showing a state in which a wheel cover according to an embodiment of the present invention is installed on a disc wheel of a car.

In FIG. 1, reference numerals 1 and 9 denote a disc wheel and a tire to be installed on the disc wheel 1, respectively. The wheel cover 10 comprises a disc-shaped wheel cover body 11 and an installing clip 12 (hereinafter referred to as clip 12) serving as a means for installing the wheel cover body 11 on the disc wheel 1. Preferably, three clips 12 are installed on a rim flange edge 2a at equal intervals, as shown in FIG. 1.

Figure 2:
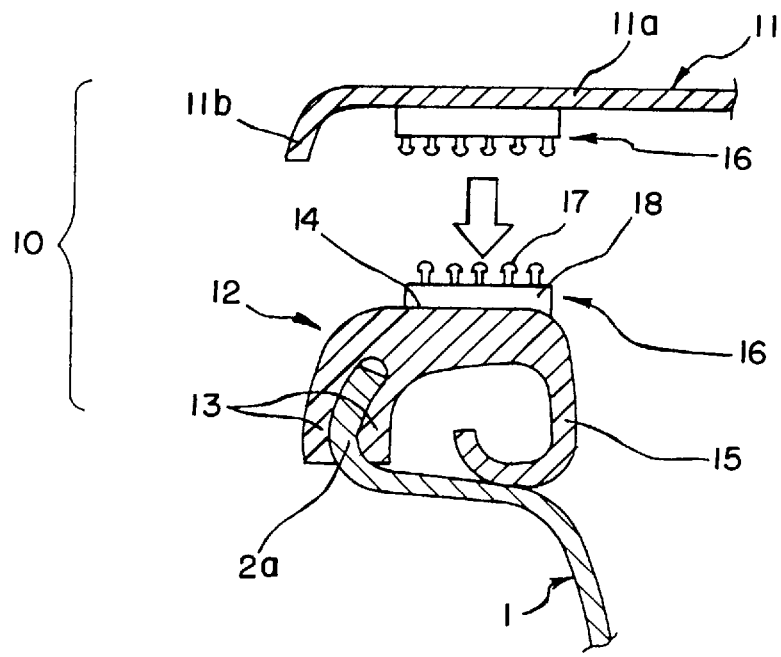
FIG. 2 is a sectional view showing a state in which the wheel cover has been installed on the disc wheel.
Figure 3:
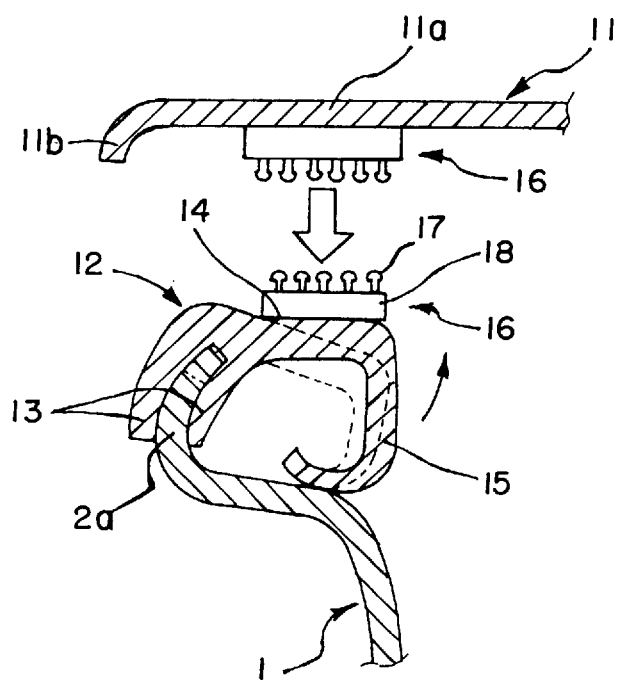
FIG. 3 is a sectional view showing a state in which the wheel cover has been installed on the disc wheel.
Figure 4A:
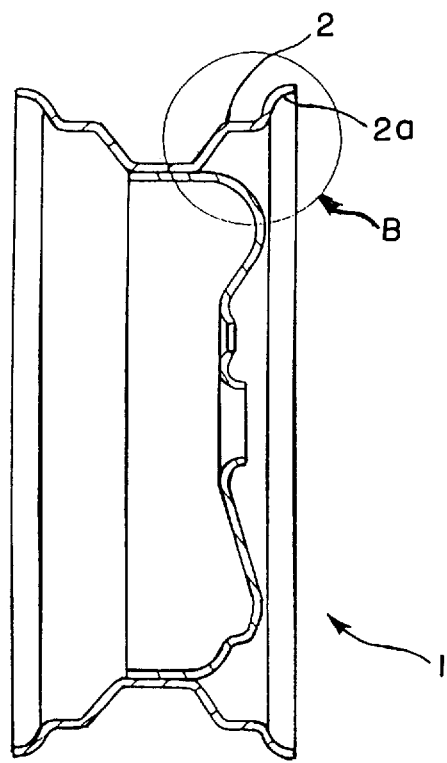
FIG. 4A is a schematic sectional view showing a conventional disc wheel.
Figure 4B:
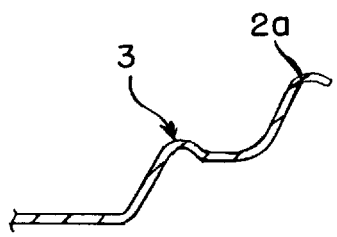
FIG. 4B is a sectional view showing an enlarged part (B) of the disc wheel shown in FIG. 4A.
Figure 5:
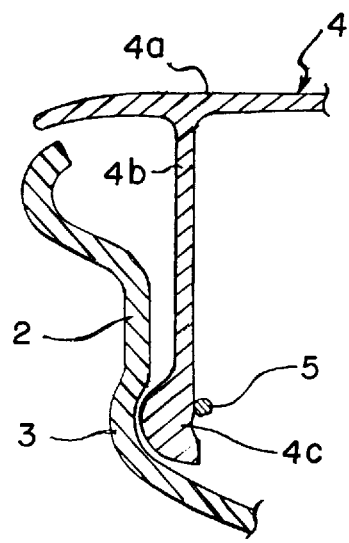
FIG. 5 is a sectional view showing an example of a conventional construction for installing a wheel cover on a disc wheel.
Figure 6:
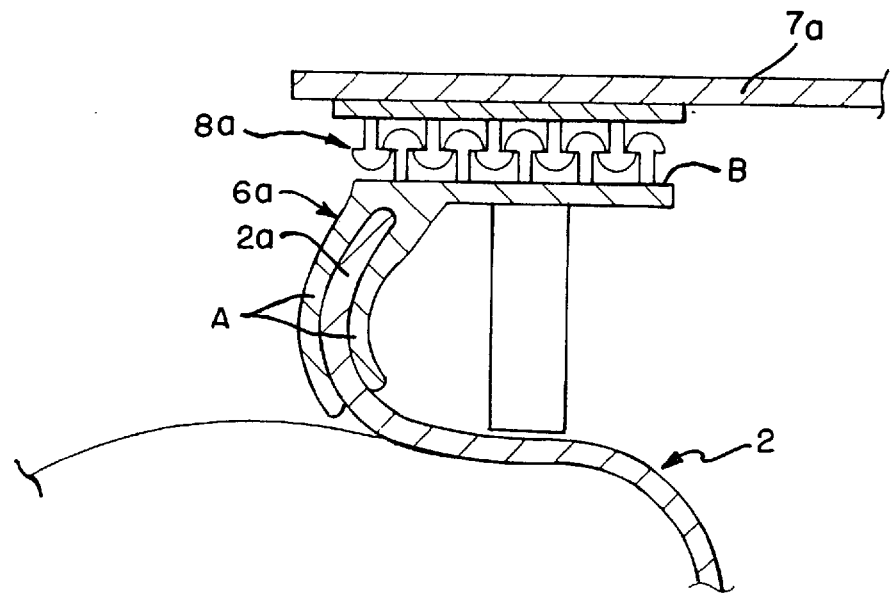
FIG. 6 is a sectional view showing another example of a conventional construction for installing a wheel cover on a disc wheel.

As shown in FIG. 2, the wheel cover body 11 comprises a disc-shaped cover 11a having an outer diameter equal to or a little larger than that of the rim flange edge 2a of the disc wheel 1 and a peripheral wall 11b extending downward, namely, toward the disc wheel 1 from the peripheral edge of the cover 11a. The peripheral wall 11b allows the wheel cover body 11 to have a sufficient strength.

Each clip 12 has a sandwiching portion 13 positioned at one side thereof and consisting of two sandwiching walls which sandwich the rim flange edge 2a of the disc wheel 1 therebetween and a connection portion having a receiving surface 14 for fixing the wheel cover body 11 thereto. In the example shown in FIG. 2, the clip 12 is made of molded plastic. Thus, the sandwiching portion 13, the receiving surface 14, and the portion of the clip 12 intermediate therebetween are all elastic. The clip 12 may be made of a bent metal plate having a high degree of elasticity.

The clip 12 further comprises an angle-adjusting portion 15 which is positioned at the other side thereof and is elastically pressed against the inner surface of the rim flange edge 2a so as to adjust the angle of the receiving surface 14 to that of the underside of the wheel cover body 11, namely, to make the receiving surface 14 parallel with the underside of the wheel cover body 11. As shown in FIG. 2, the angle-adjusting portion 15 is continuous with one end of the receiving surface 14 and extending downward therefrom at a right angle therewith. The front end of the angle-adjusting portion 15 is curved upward and confronts the inner sandwiching surface of the sandwiching portion 13. The sandwiching portion 13 is curved slightly along the circumferential direction of the disc wheel 1 in conformity to the curvature of the rim flange edge 2a of the disc wheel 1.

A plane fastener 16 is formed on the upper surface of the clip 12, namely, the wheel cover-receiving surface 14. The plane fastener 16 comprises a base sheet 18 and a large number of mushroom-shaped projections 17 formed densely thereon. In the example shown in FIG. 2, the plane fastener 16 is fixed to the clip 12. But the plane fastener 16 may be formed integrally with the clip 12 by means of monolithic molding. In order to fix the wheel cover body 11 to the receiving surface 14 of the clip 12, another plane fastener 16 comprising a base sheet 18 and a large number of mushroom-shaped projections 17 formed densely thereon is fixed to the underside of the wheel cover body 11 in correspondence to the position of the clip 12.

The wheel cover 10 is installed on the disc wheel 1 as follows: The clip 12 is installed on the rim flange edge 2a, with the sandwiching portion 13 sandwiching the rim flange edge 2a. Then, the wheel cover body 11 is pressed against the clip 12, with the plane fastener 16 of the wheel cover body 11 placed in position. In the wheel cover-installing operation, because the angle-adjusting portion 15 elastically supports the wheel cover body 11 while it is being pressed against clip 12, the front ends of the mushroom-shaped projections 17 of both plane fasteners 16 can engage each other tightly. In the state in which the wheel cover 10 has been installed on the disc wheel 1, the wheel cover 10 covers the disc wheel 1 in the region thereof positioned inward from the rim flange edge 2a of the disc wheel 1 in the radial direction of the disc wheel 1, because the diameter of the wheel cover 10 is equal to or slightly greater than that of the rim flange edge 2a.

Figure 8:
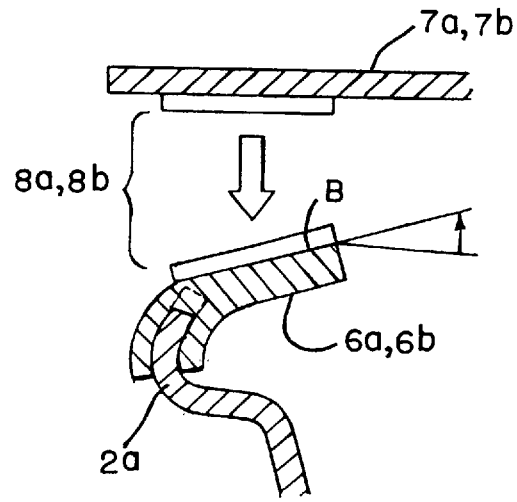
FIG. 8 is a sectional view showing a state in which the wheel cover having the conventional construction cannot be normally installed on the clip.
Figure 9:
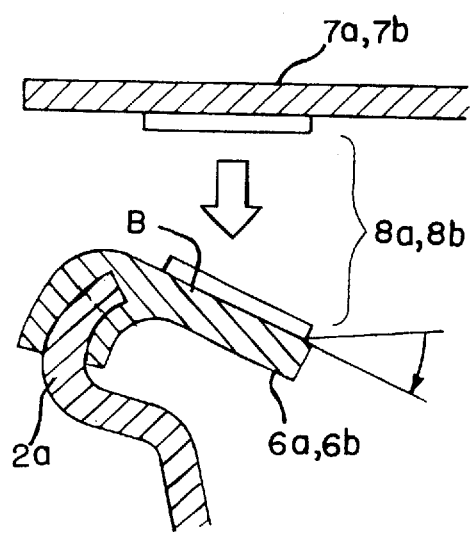
FIG. 9 is a sectional view showing a state in which the wheel cover having the conventional construction cannot be normally installed on the clip.

When the size of the rim flange edge 2a conforms to the standardized size, it is unnecessary to operate the angle-adjusting portion 15 in installing the wheel cover body 11 on the clip 12 because the clip 12 can be mounted on the rim flange edge 2a horizontally, namely, parallel with the wheel cover body 11, as shown in FIG. 2. When the rim flange edge 2a does not satisfy the standardized size, i.e., if it is longer than the standardized size, as shown by an imaginary line of FIG. 3, the clip 12 will be installed on the rim flange edge 2a as shown by another imaginary line of FIG. 3. But merely pulling the angle-adjusting portion 15 upward and to the right-hand side as shown by an arrow of FIG. 3 allows the receiving surface 14 to be parallel with the lower surface of the wheel cover body 11 as shown by a solid line of FIG. 3. Therefore, the wheel cover body 11 can be reliably installed on the clip 12 without an accurate size control of the clip 12. When the receiving surface 14 inclines in the opposite direction as shown in FIG. 8, both plane fasteners 16 can be engaged with each other by pressing the wheel cover body 11 against the clip 12.

In the wheel cover 10 having the above-described construction, the clip 12 can be installed on the disc wheel 1 having the same standardized diameter, by mounting the sandwiching portion 13 of the clip 12 on the rim flange edge 2a, irrespective of the type thereof, provided that the rim flange edge 2a has a permissible size variation. In addition, the wheel cover 10 can be installed on the disc wheel 1 having no hump formed thereon.

Moreover, in the wheel cover 10 and the clip 12 having the above-described construction, the clip 12 can be installed at any desired positions of the rim flange edge 2a in its circumferential direction. Thus, even though a balance weight is installed on the rim flange edge 2a, the mounting position of the wheel cover 10 is not limited to a particular position. The wheel cover body 11 can be installed on the disc wheel 1 even though both plane fasteners 16 are dislocated relatively to each other to a small extent, provided that the mushroom-shaped projections 17 of both plane fasteners 16 engage tightly. If both plane fasteners 16 are greatly dislocated relatively to each other, the dislocation can be corrected easily by shifting the installing position of the clip 12 in the circumferential direction of the rim flange edge 2a.

Most of the constituent parts of the clip 12 are positioned inwardly in the radial direction of the rim flange edge 2a of the disc wheel 1. That is, only a part of the sandwiching portion 13 is positioned outward in the radial direction of the rim flange edge 2a. Thus, there is little possibility that the clip 12 is affected by the deformation of the tire 6 while the car is traveling. Further, because the clip 12 is positioned at the underside of the wheel cover body 11, the clip 12 cannot be seen from the outside, thus not deteriorating the wheel cover body 11 in the viewpoint of ornament.

It has been described that three clips 12 are installed on the rim flange edge 2a in order to reliably install the wheel cover 10 on the disc wheel 1. But it is possible to alter the number of the clips 12 and the position thereof as desired. For example, if the clips 12 cannot be installed an the rim flange edge 2a at equal intervals because the balance weight has been installed thereon, it is preferable to make the intervals between the adjacent clips 12 equal as much as possible.

No claws which engage the hump of the disc wheel 1 are formed on the wheel cover body 11 having the above-described construction, it is possible to manufacture the wheel cover body 11 not by injection molding but by vacuum forming of a plate-shaped plastic material by using a die having a simple shape. Accordingly, the wheel cover body 11 can be manufactured at a low cost.

Figure 7:
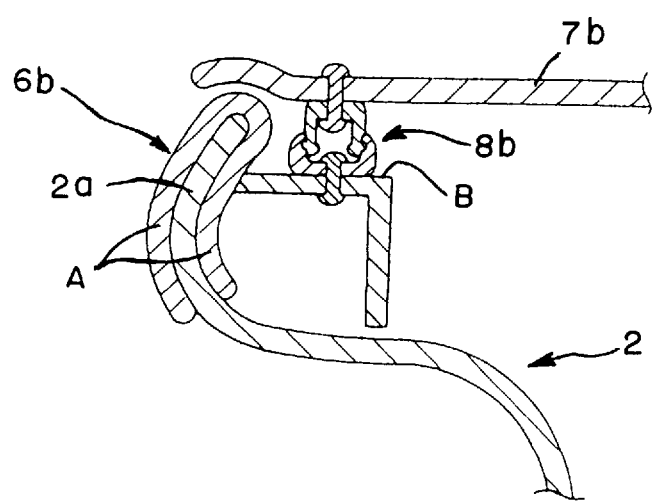
FIG. 7 is a sectional view showing still another example of a conventional construction for installing a wheel cover on a disc wheel.

In the above-described embodiment, the plane fasteners 16 having the mushroom-shaped projections 17 formed densely thereon are used to fix the wheel cover body 11 to the clip 12. But the present invention is not limited to the above-described construction, but various modifications can be made. For example, a large number of loops densely formed on one of the plane fasteners 16, and a large number of hooks densely formed on the other of the plane fasteners 16 is another alternative. Further, instead of the plane fastener 16, an engaging means consisting of a female button and a male button which engages the female button as shown in FIG. 7 or other engaging means may be used.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A clip for connecting a wheel cover to a disc wheel for a car, comprising,
    a sandwiching portion having at least two sandwiching walls for fixedly sandwiching a rim flange edge of the disc wheel therebetween,
    a connection portion having a receiving surface for connecting to a wheel cover body,
    an elastic intermediate portion positioned between the sandwiching portion and the connection portion, and
    an angle-adjusting portion for adjusting the angle of the receiving surface to that of the wheel cover body so that the receiving surface is parallel with an underside of the wheel cover body, the angle-adjusting portion being formed continuous with the connection portion to elastically press an inner surface of the rim flange edge at a position apart from the sandwiching portion.

2. A wheel cover for uses in a car comprising,
    a disc-like wheel cover body,
    a plurality of clips secured on a disc wheel, and
    a plurality of fixtures for connecting the wheel cover body to the clips,
    each clip comprising a sandwiching portion having at least two sandwiching walls for fixedly sandwiching a rim flange edge of the disc wheel therebetween, a connection portion having a receiving surface removably connected to the wheel cover body, an elastic intermediate portion positioned between the sandwiching portion and the connection portion, and an angle-adjusting portion for adjusting an angle of the receiving surface to that of the wheel cover body so that the receiving surface is parallel with an underside of the wheel cover body, the angle-adjusting portion being formed continuous with the connection portion to elastically press an inner surface of the rim flange edge at a position apart from the sandwiching portion.

3. The clip according to claim 1, wherein said angle-adjusting portion is located on one side of said connection portion and said elastic intermediate portion is located on another side of the connection portion.

4. The clip according to claim 3, wherein a fastener is secured to an upper surface of said connection portion for removably cooperating with a complementary fastener on the wheel cover body.

5. The clip according to claim 1, wherein said angle-adjusting portion is J-shaped in cross-section.

6. The clip according to claim 5, wherein said angle-adjusting portion includes a first portion extending in a generally perpendicular direction away from said connection portion, a second portion curved from said generally perpendicular direction to a generally parallel direction with respect to said connection portion and a third portion curving from said generally parallel direction back toward said connection portion.

7. The clip according to claim 2, wherein said angle-adjusting portion is located on one side of said connection portion and said elastic intermediate portion is located on another side of the connection portion.

8. The clip according to claim 7, wherein a fastener is secured to an upper surface of said connection portion for removably cooperating with a complementary fastener on said wheel cover body.

9. The clip according to claim 2, wherein said angle-adjusting portion is J-shaped in cross-section.

10. The clip according to claim 9, wherein said angle-adjusting portion includes a first portion extending in a generally perpendicular direction away from said connection portion, a second portion curved from said generally perpendicular direction to a generally parallel direction with respect to said connection portion and a third portion curving from said generally parallel direction back toward said connection portion.

* * * * *

UNITED STATES PATENT AND TRADEMARK OFFICE
CERTIFICATE OF CORRECTION

PATENT NO. : 5,873,637
DATED : February 23, 1999
INVENTOR(S) : Takashi ICHIKAWA It is certified that error appears in the above-identified patent and that said Letters Patent is hereby corrected as shown below:

On the cover page of the patent, in item 22, please change the filing date of the application from "March 19, 1997" to --March 18, 1997--.

Signed and Sealed this

Third Day of August, 1999

Attest:

Q. TODD DICKINSON

Attesting Officer

Acting Commissioner of Patents and Trademarks